United States Patent
Wu et al.

(10) Patent No.: US 12,418,632 B1
(45) Date of Patent: Sep. 16, 2025

(54) SMOKE VISUALIZATION DETECTION SYSTEM AND METHOD FOR A WIND GENERATING NACELLE

(71) Applicants: Huaneng Shaanxi Zichang Power Generation Co., Ltd., Shaanxi (CN); HUANENG DINGBIAN NEW ENERGY POWER GENERATION CO., LTD., Shaanxi (CN)

(72) Inventors: Yonghua Wu, Shaanxi (CN); Le Wen, Shaanxi (CN); Rui Yang, Shaanxi (CN); Chao Guo, Shaanxi (CN); Xi Wang, Shaanxi (CN); Chenhuai Yan, Shaanxi (CN); Jun Liu, Shaanxi (CN)

(73) Assignees: Huaneng Shaanxi Zichang Power Generation Co., Ltd., Yan'an (CN); HUANENG DINGBIAN NEW ENERGY POWER GENERATION CO., LTD., Yulin (CN)

( * ) Notice: Subject to any disclaimer, the term of this patent is extended or adjusted under 35 U.S.C. 154(b) by 0 days.

(21) Appl. No.: 19/238,323

(22) Filed: Jun. 13, 2025

(30) Foreign Application Priority Data

Jan. 24, 2025 (CN) .......................... 202510116650.0

(51) Int. Cl.
*H04N 7/18* (2006.01)
*F03D 17/00* (2016.01)
(Continued)

(52) U.S. Cl.
CPC ........... *H04N 7/183* (2013.01); *F03D 17/009* (2023.08); *G06V 10/75* (2022.01); *G06V 20/40* (2022.01);
(Continued)

(58) Field of Classification Search
None
See application file for complete search history.

(56) References Cited

U.S. PATENT DOCUMENTS 5,832,187 A * 11/1998 Pedersen .............. G08B 17/005
706/900
10,971,192 B2 * 4/2021 Lawlor .................. G06V 20/52
(Continued)

FOREIGN PATENT DOCUMENTS

CN 101334924 A 12/2008
CN 112102590 A 12/2020
(Continued)

*Primary Examiner* — Delomia L Gilliard

(57) ABSTRACT

Provided are a smoke visualization detection system and method for a wind generating nacelle. When the video monitoring module judges that smoke exists in the wind generating nacelle, it issues a smoke change instruction; the smoke detection module collects smoke visualization detection data for a plurality of collection time intervals; the data analysis module analyses the smoke visualization detection data, calculates a sub-smoke visualization detection data change coefficient and a smoke visualization detection data transmission coefficient; the environment analysis module determines a historical transmission behavior and current data transmission environment data, and calculates a data transmission influence coefficient; the data transmission module obtains a target smoke visualization detection data transmission coefficient based on the data transmission influence coefficient, and adjusts a data transmission strategy, to ensure the transmission speed of the smoke visualization detection data, improves transmission stability and real-time performance, and enhances the fire safety level of the nacelle.

9 Claims, 2 Drawing Sheets

Figure 1:
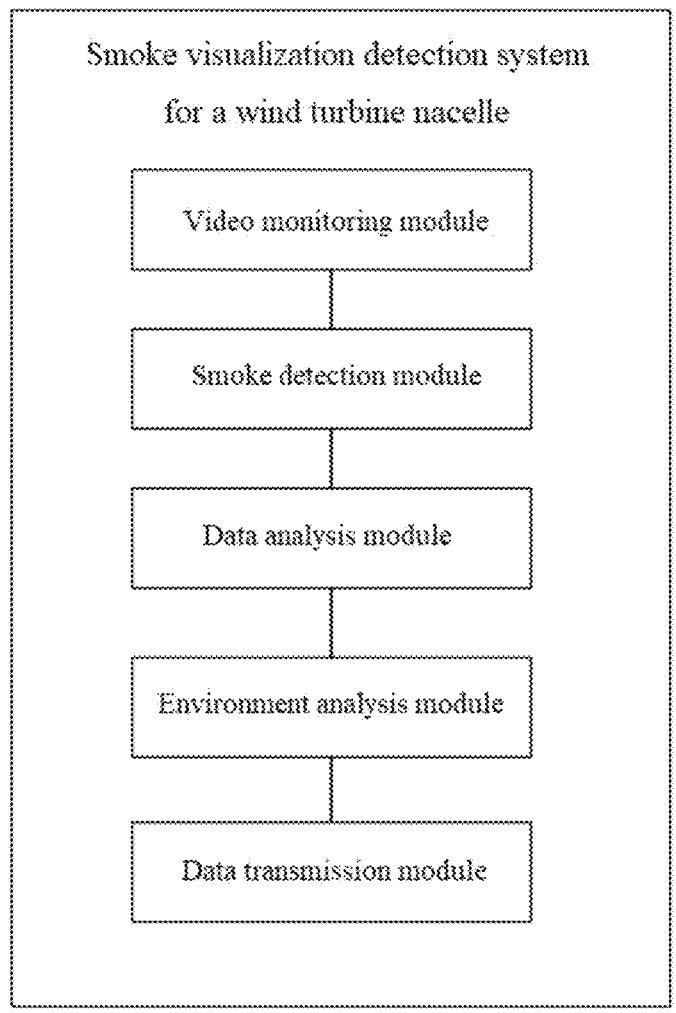

(51) Int. Cl.
*G06V 10/75* (2022.01)
*G06V 20/40* (2022.01)
*G06V 20/52* (2022.01)
*G08B 17/12* (2006.01)
*H04L 1/00* (2006.01)

(52) U.S. Cl.
CPC ........... *G06V 20/52* (2022.01); *G08B 17/125* (2013.01); *H04L 1/0015* (2013.01)

(56) References Cited

U.S. PATENT DOCUMENTS

| | | | |
|---|---|---|---|
| 2002/0026431 A1* | 2/2002 | Pedersen | G08B 17/125 706/1 |
| 2018/0047271 A1* | 2/2018 | Bai | H04N 25/447 |
| 2020/0078622 A1 | 3/2020 | Knoop et al. | |
| 2020/0143666 A1 | 5/2020 | Belli | |
| 2021/0225146 A1* | 7/2021 | Ghyme | G06V 20/52 |
| 2024/0281908 A1* | 8/2024 | Morris | G06F 21/32 |

FOREIGN PATENT DOCUMENTS

| | | | | |
|---|---|---|---|---|
| CN | 113750431 A | * | 12/2021 | ............. A62C 37/50 |
| CN | 116959194 A | | 10/2023 | |
| CN | 117789394 A | | 3/2024 | |
| CN | 119206605 A | | 12/2024 | |
| KR | 101044903 B1 | * | 6/2011 | ............. G06T 7/277 |

\* cited by examiner

SMOKE VISUALIZATION DETECTION SYSTEM AND METHOD FOR A WIND GENERATING NACELLE

CROSS-REFERENCE TO RELATED APPLICATIONS

The present application claims priority of Chinese Patent Application No. 202510116650.0, filed on Jan. 24, 2025, the content of which are hereby incorporated by reference in its entirety.

TECHNICAL FIELD

The present disclosure relates to the technical field of data transmission, and in particular, to a smoke visualization detection system and method for a wind generating nacelle.

BACKGROUND

A wind generating nacelle generally refers to a nacelle cover of a wind generating set, which is an important structure for accommodating and protecting key components. It is a protective housing of the wind generating set, enclosing all components within the nacelle therein and isolating them from the outside. With the continuous development and innovation of technology, the performance and efficiency of a wind generating nacelle will also be continuously improved. Among the various factors affecting the safety of a wind generating set, the monitoring and management of smoke inside the nacelle is particularly critical, as they directly relate to the safe operation of the set and the prevention and control of potential fire risks.

In the prior art, common smoke visualization detection data (such as key information such as smoke concentration and smoke temperature) transmission method uses a multi-hop routing protocol to determine a data transmission path of smoke visualization detection data, and then uses a fixed data transmission strategy, such as a fixed transmission speed, to transmit the smoke visualization detection data. This method has certain limitations. Due to the limitation factors of the data transmission path itself, the smoke visualization detection data may become unstable or even interrupted during high-speed transmission. Moreover, the existing technology is unable to adaptively adjust the data transmission strategy, which further exacerbates the phenomena of data transmission delay and data loss, and directly affects the judgment and decision speed of the fire department to the situation of the fire scene.

SUMMARY

Embodiments of the present disclosure provide a smoke visualization detection system and method for a wind generating nacelle. The present disclosure can achieve complete transmission of smoke visualization detection data, ensure the transmission speed of the smoke visualization detection data, improve transmission stability and real-time performance, and provide a reliable precondition for the fire department to judge and make decisions on the situation of the fire scene.

In order to achieve the above objectives, the present disclosure provides a smoke visualization detection system for a wind generating nacelle, including:

a video monitoring module configured to perform real-time video monitoring on the wind generating nacelle, judge whether smoke exists in the wind generating nacelle, and issue a smoke change instruction when smoke exists in the wind generating nacelle;

a smoke detection module configured to, when detecting the smoke change instruction, collect smoke visualization detection data corresponding to a plurality of collection time intervals for the wind generating nacelle based on a preset smoke sensor and a preset temperature sensor, where the smoke visualization detection data includes smoke visualization concentration and smoke visualization temperature, and each collection time interval is provided with a plurality of sub-collection time nodes;

a data analysis module configured to analyse the smoke visualization detection data corresponding to each collection time interval, calculate a sub-smoke visualization detection data change coefficient for the collection time interval, and calculate a smoke visualization detection data transmission coefficient for the wind generating nacelle according to the sub-smoke visualization detection data change coefficient for the each collection time interval;

an environment analysis module configured to determine a historical transmission behavior of a data transmission path, determine current data transmission environment data of the data transmission path, and calculate a data transmission influence coefficient of the data transmission path according to the historical transmission behavior and the current data transmission environment data; and a data transmission module configured to adjust the smoke visualization detection data transmission coefficient based on the data transmission influence coefficient to obtain a target smoke visualization detection data transmission coefficient, and adjust a data transmission strategy of the smoke visualization detection data based on the target smoke visualization detection data transmission coefficient.

Further, the data analysis module is configured to:

the data analysis module is configured to extract an initial smoke visualization concentration corresponding to an initial sub-collection time node in the collection time interval;

the data analysis module is configured to extract an end smoke visualization concentration corresponding to an end sub-collection time node in the collection time interval;

the data analysis module is configured to calculate a smoke visualization concentration difference value between the initial smoke visualization concentration and the end smoke visualization concentration;

the data analysis module is configured to calculate a smoke visualization concentration factor for the collection time interval according to the initial smoke visualization concentration, the end smoke visualization concentration, and the smoke visualization concentration difference value;

the data analysis module is configured to extract an initial smoke visualization temperature corresponding to the initial sub-collection time node in the collection time interval;

the data analysis module is configured to extract an end smoke visualization temperature corresponding to the end sub-collection time node in the collection time interval;

the data analysis module is configured to calculate a smoke visualization temperature difference value between the initial smoke visualization temperature and the end smoke visualization temperature;

the data analysis module is configured to calculate a smoke visualization temperature factor for the collection time interval according to the initial smoke visualization temperature, the end smoke visualization temperature, and the smoke visualization temperature difference value; and the data analysis module is configured to calculate the sub-smoke visualization detection data change coefficient for the collection time interval based on the smoke visualization concentration factor and the smoke visualization temperature factor.

Further, the data analysis module is configured to:

the data analysis module is configured to calculate the smoke visualization concentration factor for the collection time interval according to the following formula:

$$q1 = \frac{\frac{w1+w2+w3}{3} - (w1e1+w2e2+w3e3)}{\ln\left(2 + \frac{\max((w1-w3),(w2-w3))}{r}\right)} \times \left(0.05 + \ln\left(2 + \frac{t1+t2}{t3}\right)\right);$$

where q1 is the smoke visualization concentration factor for the collection time interval, w1 is the initial smoke visualization concentration, w2 is the end smoke visualization concentration, w3 is the smoke visualization concentration difference value, e1 is a calculation coefficient corresponding to the initial smoke visualization concentration, e2 is a calculation coefficient corresponding to the end smoke visualization concentration, e3 is a calculation coefficient corresponding to the smoke visualization concentration difference value, with e2>e3>e1>0, r is the number of the sub-collection time nodes within the collection time interval, t1 is a mean value of all remaining smoke visualization concentrations except the initial smoke visualization concentration, t2 is a mean value of all remaining smoke visualization concentrations except the end smoke visualization concentration, and t3 is a mean value of all smoke visualization concentrations.

Further, the data analysis module is configured to:

the data analysis module is configured to calculate the sub-smoke visualization detection data change coefficient for the collection time interval according to the following formula:

$$y = u1 \times q1 + u2 \times q2;$$

where y is a sub-smoke visualization detection data change coefficient for the collection time interval, u1 is a weight corresponding to the smoke visualization concentration factor, u2 is a weight corresponding to the smoke visualization temperature factor, and q2 is the smoke visualization temperature factor.

Further, the data analysis module is configured to:

the data analysis module is configured to perform point diagram mapping on all sub-smoke visualization detection data change coefficients to determine a sub-smoke visualization detection data change coefficient point diagram;

the data analysis module is configured to perform identical point calibration on identical sub-smoke visualization detection data change coefficients on the sub-smoke visualization detection data change coefficient point diagram and determine a first number of identical points;

the data analysis module is configured to extract one sub-smoke visualization detection data change coefficient from each identical point and calculate a corresponding first sum of sub-smoke visualization detection data change coefficients;

the data analysis module configured to calculate a coefficient mean value of all sub-smoke visualization detection data change coefficients and delete all identical points smaller than the coefficient mean value;

the data analysis module configured to count remaining identical points and determine a second number of identical points;

the data analysis module configured to extract one sub-smoke visualization detection data change coefficient from each of the remaining identical points and calculate a corresponding second sum of sub-smoke visualization detection data change coefficients;

the data analysis module configured to calculate the smoke visualization detection data transmission coefficient for the wind generating nacelle according to the first number of identical points, the second number of identical points, the first sum of sub-smoke visualization detection data change coefficients, and the second sum of sub-smoke visualization detection data change coefficients.

Further, the environment analysis module is configured to:

the environment analysis module is configured to classify the historical transmission behavior into a historical stable transmission behavior and a historical abnormal transmission behavior;

the environment analysis module is configured to parse each historical abnormal transmission behavior to determine corresponding historical abnormal environment data;

the environment analysis module is configured to count historical abnormal environment data occurrence number corresponding to each historical abnormal environment data;

the environment analysis module is configured to sort all historical abnormal environment data occurrence numbers in a descending order, extract the first p historical abnormal environment data occurrence numbers, and determine corresponding historical abnormal environment data as extracted historical abnormal environment data;

the environment analysis module is configured to parse each historical stable transmission behavior to determine corresponding historical stable environment data;

the environment analysis module is configured to count historical stable environment data occurrences numbers corresponding to the extracted historical abnormal environment data in all historical stable environment data;

the environment analysis module is configured to partition the extracted historical abnormal environment data according to a relationship between the extracted historical abnormal environment data and historical preset environment data, and when the extracted historical abnormal environment data is less than the historical preset environment data, classify corresponding extracted historical abnormal environment data into a first data region;

the environment analysis module is configured to, when the extracted historical abnormal environment data is greater than the historical preset environment data, classify the corresponding extracted historical abnormal environment data into a second data region;

the environment analysis module is configured to calculate an environment data difference value between each extracted historical abnormal environment data in the first data region and the historical preset environment data, and obtain a first environment data difference value region;

the environment analysis module is configured to calculate an environment data difference value between each extracted historical abnormal environment data in the second data region and the historical preset environment data, and obtain a second environment data difference value region;

the environment analysis module is configured to determine, from the current data transmission environment data, current data transmission environment data corresponding to the extracted historical abnormal environment data, and use the current data transmission environment data as current data transmission environment data to be processed;

the environment analysis module is configured to bind the current data transmission environment data to be processed according to a relationship between the current data transmission environment data to be processed and current preset data transmission environment data, and when the current data transmission environment data to be processed is less than the current preset data transmission environment data, bind the current data transmission environment data to be processed to the first environment data difference value region;

the environment analysis module is configured to, when the current data transmission environment data to be processed is greater than the current preset data transmission environment data, bind the current data transmission environment data to be processed to the second environment data difference value region; and the environment analysis module is configured to calculate the data transmission influence coefficient of the data transmission path based on the first environment data difference value region, the second environment data difference value region, and a binding result.

Further, the environment analysis module is configured to:

the environment analysis module is configured to calculate the data transmission influence coefficient of the data transmission path according to the following formula:

$$s = \Delta s1 + \Delta s2;$$

$$s1 = \left(\frac{\sum_{i=1}^{a} d1_i}{\sum_{j=1}^{g} d2_j}\right) + \sum_{b}^{v1}\left(1 - \left(1 - \frac{k1_b}{k2_b}\right) \times c_b\right); \text{ and}$$

$$s2 = \left(\frac{\sum_{j=1}^{g} d2_j}{\sum_{i=1}^{a} d1_i}\right) + \sum_{n}^{v2}\left(1 - \left(1 - \frac{f1_n}{f2_n}\right) \times m_n\right);$$

where s is the data transmission influence coefficient of the data transmission path, a is a number of environment data difference values in the first environment data difference value region, $d1_i$ is an ith environment data difference value in the first environment data difference value region, g is a number of environment data difference values in the second environment data difference value region, $d2_j$ is a jth environment data difference value in the second environment data difference value region, v1 is a number of the current data transmission environment data to be processed bound to the first environment data difference value region, $c_b$ is a bth current data transmission environment data to be processed bound to the first environment data difference value region, $k1_b$ is the historical abnormal environment data occurrence number of the bth current data transmission environment data to be processed, $k2_b$ is the historical stable environment data occurrence number of the bth current data transmission environment data to be processed, v2 is a number of the current data transmission environment data to be processed bound to the second environment data difference value region, $m_n$ is a nth current data transmission environment data to be processed bound to the second environment data difference value region, $f1_n$ is the historical abnormal environment data occurrence number of the nth current data transmission environment data to be processed, and $f2_n$ is the historical stable environment data occurrence number of the nth current data transmission environment data to be processed.

Further, the data transmission module is configured to:

the data transmission module is configured to set a plurality of preset data transmission influence coefficients;

the data transmission module is configured to set a plurality of preset adjustment coefficients; and the data transmission module is configured to select a corresponding preset adjustment coefficient according to the data transmission influence coefficient and a preset data transmission influence coefficient, adjust the smoke visualization detection data transmission coefficient, and obtain the target smoke visualization detection data transmission coefficient, where the target smoke visualization detection data transmission coefficient is a product value of the smoke visualization detection data transmission coefficient and the preset adjustment coefficient, and the data transmission influence coefficient and the preset data transmission influence coefficient are in an inverse proportion relationship.

Further, the data transmission module is configured to:

the data transmission module configured to determine a current data transmission speed of the data transmission path;

the data transmission module configured to set a plurality of preset target smoke visualization detection data transmission coefficients;

the data transmission module configured to set a plurality of preset adjustment coefficients;

the data transmission module configured to select a corresponding preset adjustment coefficient according to the target smoke visualization detection data transmission coefficient and a preset target smoke visualization detection data transmission coefficient, and calculate a product value of the current data transmission speed and the preset adjustment coefficient, where the target smoke visualization detection data transmission coefficient and the preset adjustment coefficient have a positive proportional relationship.

In order to achieve the above objectives, the present disclosure further provides a smoke visualization detection method for a wind generating nacelle, including:

performing real-time video monitoring on the wind generating nacelle, judging whether smoke exists in the wind generating nacelle, and issuing a smoke change instruction when smoke exists in the wind generating nacelle;

when detecting the smoke change instruction, collecting smoke visualization detection data corresponding to a plurality of collection time intervals for the wind generating nacelle based on a preset smoke sensor and a preset temperature sensor, where the smoke visualization detection data includes smoke visualization concentration and smoke visualization temperature, and each collection time interval is provided with a plurality of sub-collection time nodes;

analysing the smoke visualization detection data corresponding to each collection time interval, calculating a sub-smoke visualization detection data change coefficient for the collection time interval, and calculate a smoke visualization detection data transmission coefficient for the wind generating nacelle according to the sub-smoke visualization detection data change coefficient for the each collection time interval;

determining a historical transmission behavior of a data transmission path, determining current data transmission environment data of the data transmission path, and calculating a data transmission influence coefficient of the data transmission path according to the historical transmission behavior and the current data transmission environment data; and adjusting the smoke visualization detection data transmission coefficient based on the data transmission influence coefficient to obtain a target smoke visualization detection data transmission coefficient, and adjusting a data transmission strategy of the smoke visualization detection data based on the target smoke visualization detection data transmission coefficient.

Compared with the prior art, the present disclosure has the following beneficial effects:

The disclosure discloses a smoke visualization detection system and method for a wind generating nacelle. When the video monitoring module judges that smoke exists in the wind generating nacelle, it issues a smoke change instruction; the smoke detection module collects smoke visualization detection data for a plurality of collection time intervals; the data analysis module analyses the smoke visualization detection data, calculates a sub-smoke visualization detection data change coefficient and a smoke visualization detection data transmission coefficient; the environment analysis module determines a historical transmission behavior and current data transmission environment data, and calculates a data transmission influence coefficient; the data transmission module obtains a target smoke visualization detection data transmission coefficient based on the data transmission influence coefficient, adjusts a data transmission strategy, achieves complete transmission of the smoke visualization detection data, adjusts the data transmission strategy to ensure the transmission speed of the smoke visualization detection data, improves transmission stability and real-time performance, and enhances the fire safety level of the wind generating nacelle.

BRIEF DESCRIPTION OF THE ACCOMPANYING DRAWINGS

Figure 2:
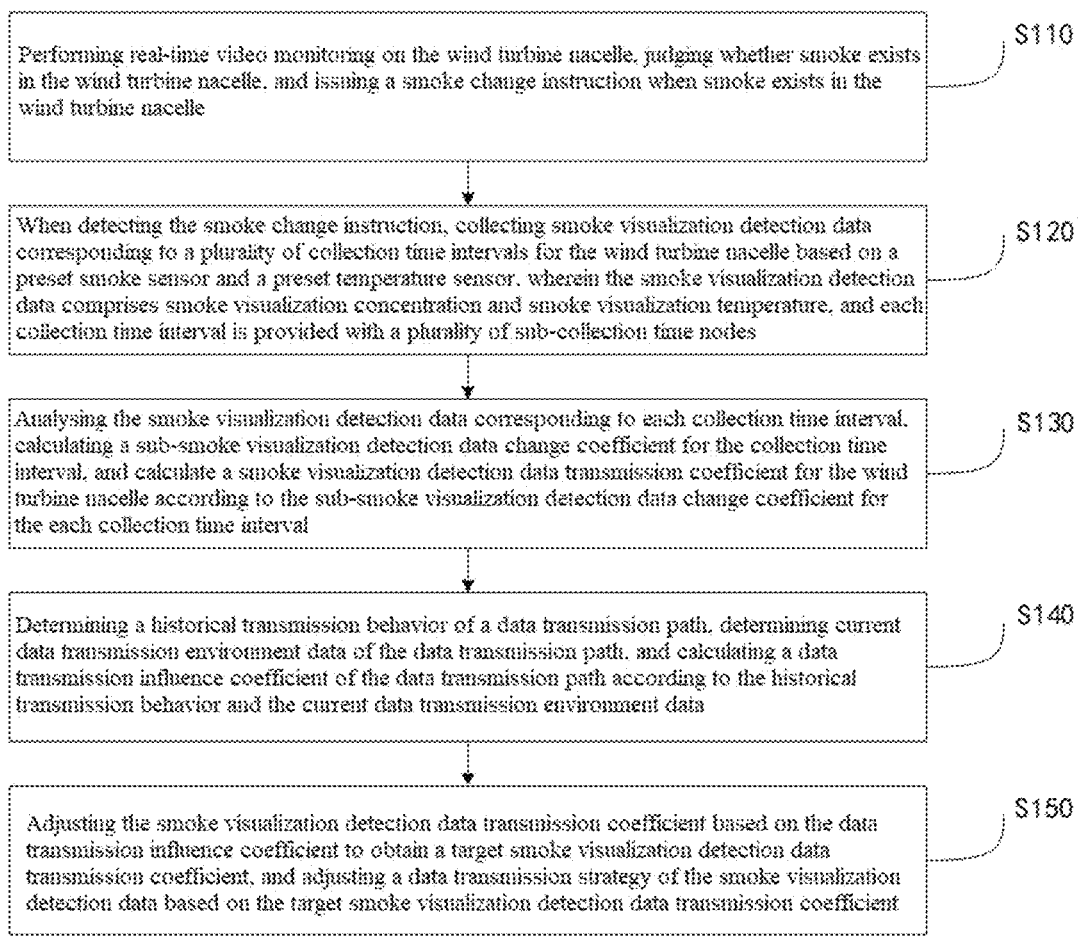

Various other advantages and benefits will become apparent to those of ordinary skill in the art by reading the following detailed description of the preferred embodiments. The accompanying drawings are merely for the purpose of illustrating the preferred embodiments and are not to be considered limiting of the disclosure. Moreover, in the entire accompanying drawings, the same reference symbols are used to refer to the same components. In the accompanying drawings:

FIG. 1 is a structural schematic diagram of a smoke visualization detection system for a wind generating nacelle in an embodiment of the present disclosure; and FIG. 2 is a schematic flowchart of a smoke visualization detection method for a wind generating nacelle in an embodiment of the present disclosure.

DETAILED DESCRIPTION OF THE EMBODIMENTS

Specific implementations of the present disclosure are further described in detail below in conjunction with the accompanying drawings and embodiments. The following embodiments are used to illustrate the present disclosure, but are not used to limit the scope of the present disclosure.

In the description of the present application, it should be understood that the orientations or positional relationships indicated by the terms "center", "upper", "lower", "front", "rear", "left", "right", "vertical", "horizontal", "top", "bottom", "inner", "outer", etc. are the orientations or positional relationships based on what is shown in the accompanying drawings, and are merely intended to facilitate describing the present application and simplify the description, rather than indicating or implying that a device or element referred to must have a specific orientation, be constructed, and operated in a specific orientation, and therefore cannot be construed as a limitation to the present application.

The terms "first" and "second" are used for descriptive purposes only and cannot be understood as indicating or implying relative importance or implicitly indicating the number of indicated technical features. Therefore, the features defined with "first" and "second" may explicitly or implicitly include one or more of the features. In the description of the present application, unless otherwise specified, "a plurality of" means two or more.

In the description of the present application, it should be noted that the terms "installation", "coupling", and "connection" should be understood in a broad sense unless explicitly specified and limited otherwise. For example, they may be a fixed connection, a detachable connection, or an integrated connection; a mechanical connection or an electrical connection; a direct coupling, an indirect coupling through an intermediate medium, or an internal communication of the two elements. For those of ordinary skill in the art, the specific meanings of the above terms in the present application may be understood in light of the specific circumstances.

The following is a description of preferred embodiments of the present disclosure in conjunction with the accompanying drawings.

As shown in FIG. 1, an embodiment of the present disclosure discloses a smoke visualization detection system for a wind generating nacelle, including:

a video monitoring module configured to perform real-time video monitoring on the wind generating nacelle, judge whether smoke exists in the wind generating nacelle, and issue a smoke change instruction when smoke exists in the wind generating nacelle;

a smoke detection module configured to, when detecting the smoke change instruction, collect smoke visualization detection data corresponding to a plurality of collection time intervals for the wind generating nacelle based on a preset smoke sensor and a preset temperature sensor, where the smoke visualization detection data includes smoke visualization concentration and smoke visualization temperature, and each collection time interval is provided with a plurality of sub-collection time nodes;

a data analysis module configured to analyse the smoke visualization detection data corresponding to each collection time interval, calculate a sub-smoke visualization detection data change coefficient for the collection time interval, and calculate a smoke visualization detection data transmission coefficient for the wind generating nacelle according to the sub-smoke visualization detection data change coefficient for the each collection time interval;

an environment analysis module configured to determine a historical transmission behavior of a data transmission path, determine current data transmission environment data of the data transmission path, and calculate a data transmission influence coefficient of the data transmission path according to the historical transmission behavior and the current data transmission environment data; and a data transmission module configured to adjust the smoke visualization detection data transmission coefficient based on the data transmission influence coefficient to obtain a target smoke visualization detection data transmission coefficient, and adjust a data transmission strategy of the smoke visualization detection data based on the target smoke visualization detection data transmission coefficient.

In this embodiment, the video monitoring module is equipped with a high-resolution image sensor, which can capture subtle smoke changes and the operational status of a device within the wind generating nacelle. For example, in the initial stage of a fire, even a small amount of smoke ascending can be clearly presented in a monitoring image, providing accurate original data for subsequent analysis. It supports the output of multiple image formats, facilitating data processing and storage, and ensuring the compatibility and efficient transmission of image data between different systems and devices.

In this embodiment, the smoke sensor and the temperature sensor can collect the smoke visualization concentration and the smoke visualization temperature, respectively.

In this embodiment, the collection time intervals are preset, such as [1th second, 10th second], [11th second, 20th second], [21th second, 30th second], etc., which are not shown here one by one. To prevent the spread of fire behavior, generally five collection time intervals are set, and a plurality of sub-collection time nodes are provided within each collection time interval. For example, for the above-mentioned [1th second, 10th second], the corresponding sub-collection time nodes are [1th second, 2nd second, 3rd second, 4th second, 5th second, 6th second, 7th second, 8th second, 9th second, 10th second], and the rest are not shown one by one. That is, 10 sets of smoke visualization concentrations and smoke visualization temperatures can be collected in each collection time interval.

The beneficial effects of the above-mentioned technical solution are as follows: the present disclosure obtains the target smoke visualization detection data transmission coefficient based on the data transmission influence coefficient, adjusts the data transmission strategy, achieves complete transmission of the smoke visualization detection data, adjusts the data transmission strategy, ensures the transmission speed of the smoke visualization detection data, improves the transmission stability and real-time performance, and enhances the fire safety level of the wind generating nacelle.

In some embodiments of the present application, the data analysis module is configured to:

the data analysis module is configured to extract an initial smoke visualization concentration corresponding to an initial sub-collection time node in the collection time interval;

the data analysis module is configured to extract an end smoke visualization concentration corresponding to an end sub-collection time node in the collection time interval;

the data analysis module is configured to calculate a smoke visualization concentration difference value between the initial smoke visualization concentration and the end smoke visualization concentration;

the data analysis module is configured to calculate a smoke visualization concentration factor for the collection time interval according to the initial smoke visualization concentration, the end smoke visualization concentration, and the smoke visualization concentration difference value;

the data analysis module is configured to extract an initial smoke visualization temperature corresponding to the initial sub-collection time node in the collection time interval;

the data analysis module is configured to extract an end smoke visualization temperature corresponding to the end sub-collection time node in the collection time interval;

the data analysis module is configured to calculate a smoke visualization temperature difference value between the initial smoke visualization temperature and the end smoke visualization temperature;

the data analysis module is configured to calculate a smoke visualization temperature factor for the collection time interval according to the initial smoke visualization temperature, the end smoke visualization temperature, and the smoke visualization temperature difference value; and the data analysis module is configured to calculate the sub-smoke visualization detection data change coefficient for the collection time interval based on the smoke visualization concentration factor and the smoke visualization temperature factor.

In this embodiment, the initial sub-collection time node is the moment when a collection time interval starts, and the end sub-collection time node is the moment when a collection time interval ends. As described above, the initial sub-collection time node is the 1st second, and the end sub-collection time node is the 10th second.

The beneficial effects of the above-mentioned technical solutions are as follows: the present disclosure realizes the initial analysis of the smoke visualization detection data by calculating the smoke visualization concentration factor and the smoke visualization temperature factor, and calculates the sub-smoke visualization detection data change coefficient for the collection time interval based on the smoke visualization concentration factor and the smoke visualization temperature factor, so that the smoke change situation within the collection time interval can be reflected by the sub-smoke visualization detection data change coefficient, avoiding the phenomenon that the change of smoke is too fast while the data transmission is too slow, which affects the judgment of the fire behavior.

In some embodiments of the present application, the data analysis module is configured to:

the data analysis module is configured to calculate the smoke visualization concentration factor for the collection time interval according to the following formula:

$$q1 = \frac{\frac{w1+w2+w3}{3} - (w1e1+w2e2+w3e3)}{\ln\left(2 + \frac{\max((w1-w3),(w2-w3))}{r}\right)} \times \left(0.05 + \ln\left(2 + \frac{t1+t2}{t3}\right)\right);$$

where q1 is the smoke visualization concentration factor for the collection time interval, w1 is the initial smoke visualization concentration, w2 is the end smoke visualization concentration, w3 is the smoke visualization concentration difference value, e1 is a calculation coefficient corresponding to the initial smoke visualization concentration, e2 is a calculation coefficient corresponding to the end smoke visualization concentration, e3 is a calculation coefficient corresponding to the smoke visualization concentration difference value, with e2>e3>e1>0, r is the number of the sub-collection time nodes within the collection time interval, t1 is a mean value of all remaining smoke visualization concentrations except the initial smoke visualization concentration, t2 is a mean value of all remaining smoke visualization concentrations except the end smoke visualization concentration, and t3 is a mean value of all smoke visualization concentrations.

In this embodiment, the process of calculating the smoke visualization concentration factor has been described above, and the process of calculating the smoke visualization temperature factor is not repeated her, which is consistent with the above and can be adaptively calculated according to the above formula.

In some embodiments of the present application, the data analysis module is configured to:

the data analysis module is configured to calculate the sub-smoke visualization detection data change coefficient for the collection time interval according to the following formula:

$y = u1 \times q1 + u2 \times q2;$ where y is a sub-smoke visualization detection data change coefficient for the collection time interval, u1 is a weight corresponding to the smoke visualization concentration factor, u2 is a weight corresponding to the smoke visualization temperature factor, and q2 is the smoke visualization temperature factor.

In some embodiments of the present application, the data analysis module is configured to:

the data analysis module is configured to perform point diagram mapping on all sub-smoke visualization detection data change coefficients to determine a sub-smoke visualization detection data change coefficient point diagram;

the data analysis module is configured to perform identical point calibration on identical sub-smoke visualization detection data change coefficients on the sub-smoke visualization detection data change coefficient point diagram and determine a first number of identical points;

the data analysis module is configured to extract one sub-smoke visualization detection data change coefficient from each identical point and calculate a corresponding first sum of sub-smoke visualization detection data change coefficients;

the data analysis module configured to calculate a coefficient mean value of all sub-smoke visualization detection data change coefficients and delete all identical points smaller than the coefficient mean value;

the data analysis module configured to count remaining identical points and determine a second number of identical points;

the data analysis module configured to extract one sub-smoke visualization detection data change coefficient from each of the remaining identical points and calculate a corresponding second sum of sub-smoke visualization detection data change coefficients; and the data analysis module configured to calculate the smoke visualization detection data transmission coefficient for the wind generating nacelle according to the first number of identical points, the second number of identical points, the first sum of sub-smoke visualization detection data change coefficients, and the second sum of sub-smoke visualization detection data change coefficients.

In this embodiment, the point diagram is a point-based data visualization form, in which each data point is represented as an independent point, and the specific determination manner will not be described in detail.

In this embodiment, each identical point may correspond to two identical sub-smoke visualization detection data change coefficients, and may also correspond to two or more sub-smoke visualization detection data change coefficients, which can be calibrated in conjunction with the actual situation.

In this embodiment, the smoke visualization detection data transmission coefficient for the wind generating nacelle is calculated according to the following formula:

$$\partial = \frac{\beta 1}{\beta 2} + \frac{\delta 1}{\delta 2};$$

where $\partial$ is the smoke visualization detection data transmission coefficient for the wind generating nacelle, $\beta 1$ is the first number of identical points, $\beta 2$ is the second number of identical points, $\delta 1$ is the first sum of sub-smoke visualization detection data change coefficients, and $\delta 2$ is the second sum of sub-smoke visualization detection data change coefficients.

The beneficial effects of the above technical solutions are as follows: the present disclosure calculates the smoke visualization detection data transmission coefficient for the wind generating nacelle according to the first number of identical points, the second number of identical points, the first sum of sub-smoke visualization detection data change coefficients, and the second sum of sub-smoke visualization detection data change coefficients, and takes the smoke visualization detection data transmission coefficient as the basis for adjusting the data transmission strategy; and when the smoke visualization detection data change coefficient is larger, the data transmission speed is larger, and conversely, when the smoke visualization detection data change coefficient is smaller, the data transmission speed is smaller.

In some embodiments of the present application, the environment analysis module is configured to:

the environment analysis module is configured to classify the historical transmission behavior into a historical stable transmission behavior and a historical abnormal transmission behavior;

the environment analysis module is configured to parse each historical abnormal transmission behavior to determine corresponding historical abnormal environment data;

the environment analysis module is configured to count historical abnormal environment data occurrence number corresponding to each historical abnormal environment data;

the environment analysis module is configured to sort all historical abnormal environment data occurrence numbers in a descending order, extract the first p historical abnormal environment data occurrence numbers, and determine corresponding historical abnormal environment data as extracted historical abnormal environment data;

the environment analysis module is configured to parse each historical stable transmission behavior to determine corresponding historical stable environment data;

the environment analysis module is configured to count historical stable environment data occurrences numbers corresponding to the extracted historical abnormal environment data in all historical stable environment data;

the environment analysis module is configured to partition the extracted historical abnormal environment data according to a relationship between the extracted historical abnormal environment data and historical preset environment data, and when the extracted historical abnormal environment data is less than the historical preset environment data, classify corresponding extracted historical abnormal environment data into a first data region;

the environment analysis module is configured to, when the extracted historical abnormal environment data is greater than the historical preset environment data, classify the corresponding extracted historical abnormal environment data into a second data region;

the environment analysis module is configured to calculate an environment data difference value between each extracted historical abnormal environment data in the first data region and the historical preset environment data, and obtain a first environment data difference value region;

the environment analysis module is configured to calculate an environment data difference value between each extracted historical abnormal environment data in the second data region and the historical preset environment data, and obtain a second environment data difference value region;

the environment analysis module is configured to determine, from the current data transmission environment data, current data transmission environment data corresponding to the extracted historical abnormal environment data, and use the current data transmission environment data as current data transmission environment data to be processed;

the environment analysis module is configured to bind the current data transmission environment data to be processed according to a relationship between the current data transmission environment data to be processed and current preset data transmission environment data, and when the current data transmission environment data to be processed is less than the current preset data transmission environment data, bind the current data transmission environment data to be processed to the first environment data difference value region;

the environment analysis module is configured to, when the current data transmission environment data to be processed is greater than the current preset data transmission environment data, bind the current data transmission environment data to be processed to the second environment data difference value region; and the environment analysis module is configured to calculate the data transmission influence coefficient of the data transmission path based on the first environment data difference value region, the second environment data difference value region, and a binding result.

In this embodiment, the historical transmission behavior refers to a historical data transmission record of the data transmission path, and a historical transmission behavior is from the start of data transmission to the end of data transmission.

In this embodiment, if a phenomenon of data loss or data delay occurs during the data transmission, it is regarded as a historical abnormal transmission behavior; and if there is no data loss or data delay, it is regarded as a historical stable transmission behavior.

In this embodiment, each historical abnormal transmission behavior has a cause leading to the abnormal transmission, and this cause is the historical abnormal environment data, including network bandwidth, electromagnetic interference degree, data transmission device temperature, number of network processes per unit time, etc. For example, the electromagnetic interference degree is relatively high, or the data transmission device temperature is relatively low or high.

In this embodiment, each historical abnormal transmission behavior corresponds to different historical abnormal environment data. Each time the historical abnormal environment data appears, the occurrence number of the corresponding historical abnormal environment data is incremented by one. For example, the network bandwidth appears 3 times, and the electromagnetic interference degree appears 5 times, etc.

In this embodiment, p is preferably 4 here.

In this embodiment, if the occurrence number of the above-mentioned electromagnetic interference degree is 5 times, the electromagnetic interference degree is taken as the extracted historical abnormal environment data.

In this embodiment, the historical stable transmission behavior also has corresponding historical stable environment data. If the electromagnetic interference degree is taken as the extracted historical abnormal environment data, the historical stable environment data occurrence number of the electromagnetic interference degree is extracted from all historical stable environment data, for example, 4 times.

In this embodiment, each extracted historical abnormal environment data corresponds to a historical preset environment data, which is used to judge whether the historical environment data is abnormal.

In this embodiment, for the above-mentioned electromagnetic interference degree, the greater the electromagnetic interference degree, the greater the impact on data transmission; and the smaller the electromagnetic interference degree, the smaller the impact on data transmission. Therefore, the electromagnetic interference degree must fall into the second data region. However, for the data transmission device temperature, both a relatively low or high temperature will have an impact on data transmission. Therefore, it is necessary to judge whether to classify the data transmission device temperature (the extracted historical abnormal environment data) into the first data region or the second data region according to the actual situation. In summary, two classification situations are provided here, and the specific judgment can be made in conjunction with the actual situation.

In this embodiment, the current data transmission environment data includes network bandwidth, electromagnetic interference degree, data transmission device temperature, number of network processes per unit time, etc.

In this embodiment, the current data transmission environment data to be processed corresponds to the above-mentioned extracted historical abnormal environment data, such as electromagnetic interference degree, data transmission device temperature, etc.

In this embodiment, the current preset data transmission environment data corresponds one-to-one to the current data transmission environment data to be processed and is used to judge whether the current data transmission environment data to be processed is abnormal.

In this embodiment, when the current data transmission environment data to be processed is equal to the current preset data transmission environment data, it does not participate in the calculation. At this time, the current data transmission environment data to be processed has no abnormality.

The beneficial effects of the above-mentioned technical solutions are as follows: the present disclosure calculates the data transmission influence coefficient of the data transmission path based on the first environment data difference value region, the second environment data difference value region, and the binding result, and can accurately solve the problem that the smoke visualization detection data becomes unstable or even interrupted during high-speed transmission due to the limiting factors of the data transmission path itself, ensuring efficient data transmission by combining the historical transmission behavior and the current data transmission environment data.

In some embodiments of the present application, the environment analysis module is configured to:
   the environment analysis module is configured to calculate the data transmission influence coefficient of the data transmission path according to the following formula:

$$s = \Delta s1 + \Delta s2;$$

$$s1 = \left(\frac{\sum_{i=1}^{a} d1_i}{\sum_{j=1}^{g} d2_j}\right) + \sum_{b}^{v1}\left(1 - \left(1 - \frac{k1_b}{k2_b}\right) \times c_b\right); \text{ and}$$

$$s2 = \left(\frac{\sum_{j=1}^{g} d2_j}{\sum_{i=1}^{a} d1_i}\right) + \sum_{n}^{v2}\left(1 - \left(1 - \frac{f1_n}{f2_n}\right) \times m_n\right);$$

where s is the data transmission influence coefficient of the data transmission path, a is a number of environment data difference values in the first environment data difference value region, $d1_i$ is an ith environment data difference value in the first environment data difference value region, g is a number of environment data difference values in the second environment data difference value region, $d2_j$ is a jth environment data difference value in the second environment data difference value region, $v_1$ is a number of the current data transmission environment data to be processed bound to the first environment data difference value region, $c_b$ is a bth current data transmission environment data to be processed bound to the first environment data difference value region, $k1_b$ is the historical abnormal environment data occurrence number of the bth current data transmission environment data to be processed, $k2_b$ is the historical stable environment data occurrence number of the bth current data transmission environment data to be processed, v2 is a number of the current data transmission environment data to be processed bound to the second environment data difference value region, $m_n$ is a nth current data transmission environment data to be processed bound to the second environment data difference value region, $f1_n$ is the historical abnormal environment data occurrence number of the nth current data transmission environment data to be processed, and $f2_n$ is the historical stable environment data occurrence number of the nth current data transmission environment data to be processed.

In this embodiment, as described above, when calculating the electromagnetic interference degree, since the electromagnetic interference degree must fall into the second data region, at this time, $$\sum_{i=1}^{a} d1_i$$

transmission device temperature falls into the first data region or the second data region, and at this time, the data transmission device temperature is calculated according to the actual situation; and for example, when calculating the network broadband, the network broadband must fall into the first data region, and at this time, $$\sum_{j=1}^{g} d2_j$$

is denoted as 1.

In this embodiment, s=Δs1+Δs2, where Δs1 denotes the summing of all s1, and Δs2 denotes the summing of all s2. Such as, if an s2 is obtained according to the calculation of the electromagnetic interference degree, and an s2 is obtained according to the calculation of the data transmission device temperature, these two s2 are summed to obtain Δs2.

In some embodiments of the present application, the data transmission module is configured to:
   the data transmission module is configured to set a plurality of preset data transmission influence coefficients;
   the data transmission module is configured to set a plurality of preset adjustment coefficients; and
   the data transmission module is configured to select a corresponding preset adjustment coefficient according to the data transmission influence coefficient and a preset data transmission influence coefficient, adjust the smoke visualization detection data transmission coefficient, and obtain the target smoke visualization detection data transmission coefficient, wherein the target smoke visualization detection data transmission coefficient is a product value of the smoke visualization detection data transmission coefficient and the preset adjustment coefficient, and the data transmission influence coefficient and the preset data transmission influence coefficient are in an inverse proportion relationship.

In this embodiment, the first preset data transmission influence coefficient is set, and preferably is 12, and the second preset data transmission influence coefficient is set, and preferably is 16.

In this embodiment, a first preset adjustment coefficient is set, and preferably is 0.85; a second preset adjustment coefficient is set, and preferably is 0.9; and a third preset adjustment coefficient is set, and preferably is 0.95.

In this embodiment, when the data transmission influence coefficient is less than the first preset data transmission influence coefficient, the third preset adjustment coefficient is selected to adjust the smoke visualization detection data transmission coefficient; when the data transmission influence coefficient is greater than or equal to the first preset data transmission influence coefficient and less than the second preset data transmission influence coefficient, the second preset adjustment coefficient is selected to adjust the smoke visualization detection data transmission coefficient; and when the data transmission influence coefficient is greater than or equal to the second preset data transmission influence coefficient, the first preset adjustment coefficient is selected to adjust the smoke visualization detection data transmission coefficient.

The beneficial effects of the above technical solutions are as follows: the present disclosure adjusts the smoke visualization detection data transmission coefficient based on the data transmission influence coefficient to obtain the target smoke visualization detection data transmission coefficient; and the present disclosure, by comprehensively considering the influence of both the smoke visualization detection data and the data transmission path on the data transmission speed, can not only ensure data transmission efficiency but also avoid the limitations imposed by the data transmission path on data transmission, thus preventing issues such as data loss or delayed transmission.

In some embodiments of the present application, the data transmission module is configured to:
the data transmission module configured to determine a current data transmission speed of the data transmission path;
the data transmission module configured to set a plurality of preset target smoke visualization detection data transmission coefficients;
the data transmission module configured to set a plurality of preset adjustment coefficients; and
the data transmission module configured to select a corresponding preset adjustment coefficient according to the target smoke visualization detection data transmission coefficient and a preset target smoke visualization detection data transmission coefficient, and calculate a product value of the current data transmission speed and the preset adjustment coefficient, wherein the target smoke visualization detection data transmission coefficient and the preset adjustment coefficient have a positive proportional relationship.

In this embodiment, the product value of the current data transmission speed and the preset adjustment coefficient is used as the data transmission speed of the smoke visualization detection data.

In this embodiment, a first preset target smoke visualization detection data transmission coefficient is set, and preferably is 4; and a second preset target smoke visualization detection data transmission coefficient is set, and preferably is 7.

In this embodiment, a first preset adjustment coefficient is set, and preferably is 0.95; a second preset adjustment coefficient is set, and preferably is 1.05; and a third preset adjustment coefficient is set, and preferably is 1.15.

In this embodiment, when the target smoke visualization detection data transmission coefficient is less than the first preset target smoke visualization detection data transmission coefficient, the first preset adjustment coefficient is selected; when the target smoke visualization detection data transmission coefficient is greater than or equal to the first preset target smoke visualization detection data transmission coefficient and less than the second preset target smoke visualization detection data transmission coefficient, the second preset adjustment coefficient is selected; and when the target smoke visualization detection data transmission coefficient is greater than or equal to the second preset target smoke visualization detection data transmission coefficient, the third preset adjustment coefficient is selected.

The beneficial effects of the above technical solutions are as follows: the present disclosure adjusts the data transmission speed of the smoke visualization detection data based on the target smoke visualization detection data transmission coefficient, achieving dynamic adjustment of the data transmission speed and avoiding the simplicity and limitations of the setting of the data transmission speed, which can not only avoid the data loss caused by an excessively fast data transmission speed but also avoid the data delay caused by an excessively slow data transmission speed, thereby ensuring the real-time performance of data transmission, providing a reliable precondition for the fire department to judge and make decisions on the situation of the fire scene, providing convenient conditions for personnel evacuation and firefighting rescue, and ensuring that the fire protection system of the entire wind generating nacelle can respond quickly, work collaboratively, and effectively deal with fire accidents.

In some embodiments of the present application, there is further included: a black box module configured to save the smoke visualization detection data, which uses a high-temperature-resistant and fireproof storage medium and can save the data for a long time in high-temperature fire environments. The recorded content includes video monitoring images, audio information (such as operation sounds and alarm sounds of a device within the nacelle), smoke sensing detection data, temperature sensing detection data, and operation logs of a data processing and control module within a period before the fire occurs. The black box module has data encryption and anti-tampering functions to ensure the authenticity and integrity of the recorded information, providing a strong basis for accident cause analysis, liability determination, and subsequent optimization and improvement of the fire protection system, thus filling the gap in this aspect of existing fire protection systems for wind generating nacelles.

To further elaborate the technical concept of the present disclosure, the technical solutions of the present disclosure will be described in conjunction with specific application scenarios.

Correspondingly, as shown in FIG. 2, the present application further provides a smoke visualization detection method for a wind generating nacelle, including:
S110: performing real-time video monitoring on the wind generating nacelle, judging whether smoke exists in the wind generating nacelle, and issuing a smoke change instruction when smoke exists in the wind generating nacelle;

S120: when detecting the smoke change instruction, collecting smoke visualization detection data corresponding to a plurality of collection time intervals for the wind generating nacelle based on a preset smoke sensor and a preset temperature sensor, wherein the smoke visualization detection data comprises smoke visualization concentration and smoke visualization temperature, and each collection time interval is provided with a plurality of sub-collection time nodes;

S130: analysing the smoke visualization detection data corresponding to each collection time interval, calculating a sub-smoke visualization detection data change coefficient for the collection time interval, and calculate a smoke visualization detection data transmission coefficient for the wind generating nacelle according to the sub-smoke visualization detection data change coefficient for the each collection time interval;

S140: determining a historical transmission behavior of a data transmission path, determining current data transmission environment data of the data transmission path, and calculating a data transmission influence coefficient of the data transmission path according to the historical transmission behavior and the current data transmission environment data;

S150: adjusting the smoke visualization detection data transmission coefficient based on the data transmission influence coefficient to obtain a target smoke visualization detection data transmission coefficient, and adjusting a data transmission strategy of the smoke visualization detection data based on the target smoke visualization detection data transmission coefficient.

In the description of the above implementations, the specific features, structures, materials, or characteristics may be combined in a suitable manner in any one or more embodiments or examples.

While the present disclosure has been described above with reference to the embodiments, various modifications may be made and equivalents may be substituted for components therein without departing from the scope of the present disclosure. In particular, the various features in the embodiments disclosed in the present disclosure may be used in combination with each other in any manner, as long as there is no structural conflict, and these combinations are not fully described in the present specification only for the sake of omitting space and saving resources.

A person of ordinary skill in the art may understand that the foregoing are merely the preferred embodiments of the present disclosure and are not intended to limit the present disclosure, although the present disclosure is described in detail with reference to the foregoing embodiments, for a person skilled in the art, the technical solutions described in the foregoing embodiments may still be modified, or some of the technical features therein may be equivalently replaced. Any modification, equivalent replacement, or improvement made within the spirit and principle of the present disclosure shall fall within the protection scope of the present disclosure.

The invention claimed is:

1. A smoke visualization detection system for a wind generating nacelle, comprising:
   a video monitoring module configured to perform real-time video monitoring on the wind generating nacelle, judge whether smoke exists in the wind generating nacelle, and issue a smoke change instruction when smoke exists in the wind generating nacelle;
   a smoke detection module configured to, when detecting the smoke change instruction, collect smoke visualization detection data corresponding to a plurality of collection time intervals for the wind generating nacelle based on a preset smoke sensor and a preset temperature sensor, wherein the smoke visualization detection data comprises smoke visualization concentration and smoke visualization temperature, and each collection time interval is provided with a plurality of sub-collection time nodes;
   a data analysis module configured to analyse the smoke visualization detection data corresponding to each collection time interval, calculate a sub-smoke visualization detection data change coefficient for the collection time interval, and calculate a smoke visualization detection data transmission coefficient for the wind generating nacelle according to the sub-smoke visualization detection data change coefficient for the each collection time interval;
   an environment analysis module configured to determine a historical transmission behavior of a data transmission path, determine current data transmission environment data of the data transmission path, and calculate a data transmission influence coefficient of the data transmission path according to the historical transmission behavior and the current data transmission environment data; and
   a data transmission module configured to adjust the smoke visualization detection data transmission coefficient based on the data transmission influence coefficient to obtain a target smoke visualization detection data transmission coefficient, and adjust a data transmission strategy of the smoke visualization detection data based on the target smoke visualization detection data transmission coefficient;
   wherein the data analysis module is configured to perform point diagram mapping on all sub-smoke visualization detection data change coefficients to determine a sub-smoke visualization detection data change coefficient point diagram;
   the data analysis module is configured to perform identical point calibration on identical sub-smoke visualization detection data change coefficients on the sub-smoke visualization detection data change coefficient point diagram and determine a first number of identical points;
   the data analysis module is configured to extract one sub-smoke visualization detection data change coefficient from each identical point and calculate a corresponding first sum of sub-smoke visualization detection data change coefficients;
   the data analysis module configured to calculate a coefficient mean value of all sub-smoke visualization detection data change coefficients and delete all identical points smaller than the coefficient mean value;
   the data analysis module configured to count remaining identical points and determine a second number of identical points;
   the data analysis module configured to extract one sub-smoke visualization detection data change coefficient from each of the remaining identical points and calculate a corresponding second sum of sub-smoke visualization detection data change coefficients; and
   the data analysis module configured to calculate the smoke visualization detection data transmission coefficient for the wind generating nacelle according to the first number of identical points, the second number of identical points, the first sum of sub-smoke visualization detection data change coefficients, and the second sum of sub-smoke visualization detection data change coefficients; and wherein the data transmission module configured to determine a current data transmission speed of the data transmission path;

the data transmission module configured to set a plurality of preset target smoke visualization detection data transmission coefficients;

the data transmission module configured to set a plurality of preset adjustment coefficients; and the data transmission module configured to select a corresponding preset adjustment coefficient according to the target smoke visualization detection data transmission coefficient and a preset target smoke visualization detection data transmission coefficient, and calculate a product value of the current data transmission speed and the preset adjustment coefficient, wherein the target smoke visualization detection data transmission coefficient and the preset adjustment coefficient have a positive proportional relationship.

2. The smoke visualization detection system for a wind generating nacelle according to claim 1, wherein the data analysis module is configured to:

the data analysis module is configured to extract an initial smoke visualization concentration corresponding to an initial sub-collection time node in the collection time interval;

the data analysis module is configured to extract an end smoke visualization concentration corresponding to an end sub-collection time node in the collection time interval;

the data analysis module is configured to calculate a smoke visualization concentration difference value between the initial smoke visualization concentration and the end smoke visualization concentration;

the data analysis module is configured to calculate a smoke visualization concentration factor for the collection time interval according to the initial smoke visualization concentration, the end smoke visualization concentration, and the smoke visualization concentration difference value;

the data analysis module is configured to extract an initial smoke visualization temperature corresponding to the initial sub-collection time node in the collection time interval;

the data analysis module is configured to extract an end smoke visualization temperature corresponding to the end sub-collection time node in the collection time interval;

the data analysis module is configured to calculate a smoke visualization temperature difference value between the initial smoke visualization temperature and the end smoke visualization temperature;

the data analysis module is configured to calculate a smoke visualization temperature factor for the collection time interval according to the initial smoke visualization temperature, the end smoke visualization temperature, and the smoke visualization temperature difference value; and the data analysis module is configured to calculate the sub-smoke visualization detection data change coefficient for the collection time interval based on the smoke visualization concentration factor and the smoke visualization temperature factor.

3. The smoke visualization detection system for a wind generating nacelle according to claim 2, wherein the data analysis module is configured to:

the data analysis module is configured to calculate the smoke visualization concentration factor for the collection time interval according to the following formula:

$$q1 = \frac{\frac{w1+w2+w3}{3} - (w1e1 + w2e2 + w3e3)}{\ln\left(2 + \frac{\max((w1-w3),(w2-w3))}{r}\right)} \times \left(0.05 + \ln\left(2 + \frac{t1+t2}{t3}\right)\right);$$

where q1 is the smoke visualization concentration factor for the collection time interval, w1 is the initial smoke visualization concentration, w2 is the end smoke visualization concentration, w3 is the smoke visualization concentration difference value, e1 is a calculation coefficient corresponding to the initial smoke visualization concentration, e2 is a calculation coefficient corresponding to the end smoke visualization concentration, e3 is a calculation coefficient corresponding to the smoke visualization concentration difference value, with e2>e3>e1>0, r is the number of the sub-collection time nodes within the collection time interval, t1 is a mean value of all remaining smoke visualization concentrations except the initial smoke visualization concentration, t2 is a mean value of all remaining smoke visualization concentrations except the end smoke visualization concentration, and t3 is a mean value of all smoke visualization concentrations.

4. The smoke visualization detection system for a wind generating nacelle according to claim 3, wherein the data analysis module is configured to:

the data analysis module is configured to calculate the sub-smoke visualization detection data change coefficient for the collection time interval according to the following formula:

$$y = u1 \times q1 + u2 \times q2;$$

where y is a sub-smoke visualization detection data change coefficient for the collection time interval, u1 is a weight corresponding to the smoke visualization concentration factor, u2 is a weight corresponding to the smoke visualization temperature factor, and q2 is the smoke visualization temperature factor.

5. The smoke visualization detection system for a wind generating nacelle according to claim 1, wherein the environment analysis module is configured to:

the environment analysis module is configured to classify the historical transmission behavior into a historical stable transmission behavior and a historical abnormal transmission behavior;

the environment analysis module is configured to parse each historical abnormal transmission behavior to determine corresponding historical abnormal environment data;

the environment analysis module is configured to count historical abnormal environment data occurrence number corresponding to each historical abnormal environment data;

the environment analysis module is configured to sort all historical abnormal environment data occurrence numbers in a descending order, extract the first p historical abnormal environment data occurrence numbers, and determine corresponding historical abnormal environment data as extracted historical abnormal environment data;

the environment analysis module is configured to parse each historical stable transmission behavior to determine corresponding historical stable environment data;

the environment analysis module is configured to count historical stable environment data occurrences numbers corresponding to the extracted historical abnormal environment data in all historical stable environment data;

the environment analysis module is configured to partition the extracted historical abnormal environment data according to a relationship between the extracted historical abnormal environment data and historical preset environment data, and when the extracted historical abnormal environment data is less than the historical preset environment data, classify corresponding extracted historical abnormal environment data into a first data region;

the environment analysis module is configured to, when the extracted historical abnormal environment data is greater than the historical preset environment data, classify the corresponding extracted historical abnormal environment data into a second data region;

the environment analysis module is configured to calculate an environment data difference value between each extracted historical abnormal environment data in the first data region and the historical preset environment data, and obtain a first environment data difference value region;

the environment analysis module is configured to calculate an environment data difference value between each extracted historical abnormal environment data in the second data region and the historical preset environment data, and obtain a second environment data difference value region;

the environment analysis module is configured to determine, from the current data transmission environment data, current data transmission environment data corresponding to the extracted historical abnormal environment data, and use the current data transmission environment data as current data transmission environment data to be processed;

the environment analysis module is configured to bind the current data transmission environment data to be processed according to a relationship between the current data transmission environment data to be processed and current preset data transmission environment data, and when the current data transmission environment data to be processed is less than the current preset data transmission environment data, bind the current data transmission environment data to be processed to the first environment data difference value region;

the environment analysis module is configured to, when the current data transmission environment data to be processed is greater than the current preset data transmission environment data, bind the current data transmission environment data to be processed to the second environment data difference value region; and the environment analysis module is configured to calculate the data transmission influence coefficient of the data transmission path based on the first environment data difference value region, the second environment data difference value region, and a binding result.

6. The smoke visualization detection system for a wind generating nacelle according to claim 5, wherein the environment analysis module is configured to:

the environment analysis module is configured to calculate the data transmission influence coefficient of the data transmission path according to the following formula:

$$s = \Delta s1 + \Delta s2;$$

$$s1 = \left(\frac{\sum_{i=1}^{a} d1_i}{\sum_{j=1}^{g} d2_j}\right) + \sum_{b}^{v1}\left(1 - \left(1 - \frac{k1_b}{k2_b}\right) \times c_b\right); \text{ and}$$

$$s2 = \left(\frac{\sum_{j=1}^{g} d2_j}{\sum_{i=1}^{a} d1_i}\right) + \sum_{n}^{v2}\left(1 - \left(1 - \frac{f1_n}{f2_n}\right) \times m_n\right);$$

where s is the data transmission influence coefficient of the data transmission path, a is a number of environment data difference values in the first environment data difference value region, $d1_i$ is an ith environment data difference value in the first environment data difference value region, g is a number of environment data difference values in the second environment data difference value region, $d2_j$ is a jth environment data difference value in the second environment data difference value region, v1 is a number of the current data transmission environment data to be processed bound to the first environment data difference value region, cb is a bth current data transmission environment data to be processed bound to the first environment data difference value region, k1b is the historical abnormal environment data occurrence number of the bth current data transmission environment data to be processed, k2b is the historical stable environment data occurrence number of the bth current data transmission environment data to be processed, v2 is a number of the current data transmission environment data to be processed bound to the second environment data difference value region, mn is a nth current data transmission environment data to be processed bound to the second environment data difference value region, f1n is the historical abnormal environment data occurrence number of the nth current data transmission environment data to be processed, and f2n is the historical stable environment data occurrence number of the nth current data transmission environment data to be processed.

7. The smoke visualization detection system for a wind generating nacelle according to claim 1, wherein the data transmission module is configured to:

the data transmission module is configured to set a plurality of preset data transmission influence coefficients;

the data transmission module is configured to set a plurality of preset adjustment coefficients; and the data transmission module is configured to select a corresponding preset adjustment coefficient according to the data transmission influence coefficient and a preset data transmission influence coefficient, adjust the smoke visualization detection data transmission coefficient, and obtain the target smoke visualization detection data transmission coefficient, wherein the target smoke visualization detection data transmission coefficient is a product value of the smoke visualization detection data transmission coefficient and the preset adjustment coefficient, and the data transmission influence coefficient and the preset data transmission influence coefficient are in an inverse proportion relationship.

8. A smoke visualization detection method for a wind generating nacelle, applied to the smoke visualization detection system for a wind generating nacelle according to claim 1 and comprising:

performing real-time video monitoring on the wind generating nacelle, judging whether smoke exists in the wind generating nacelle, and issuing a smoke change instruction when smoke exists in the wind generating nacelle;

when detecting the smoke change instruction, collecting smoke visualization detection data corresponding to a plurality of collection time intervals for the wind generating nacelle based on a preset smoke sensor and a preset temperature sensor, wherein the smoke visualization detection data comprises smoke visualization concentration and smoke visualization temperature, and each collection time interval is provided with a plurality of sub-collection time nodes;

analysing the smoke visualization detection data corresponding to each collection time interval, calculating a sub-smoke visualization detection data change coefficient for the collection time interval, and calculate a smoke visualization detection data transmission coefficient for the wind generating nacelle according to the sub-smoke visualization detection data change coefficient for the each collection time interval;

determining a historical transmission behavior of a data transmission path, determining current data transmission environment data of the data transmission path, and calculating a data transmission influence coefficient of the data transmission path according to the historical transmission behavior and the current data transmission environment data; and adjusting the smoke visualization detection data transmission coefficient based on the data transmission influence coefficient to obtain a target smoke visualization detection data transmission coefficient, and adjusting a data transmission strategy of the smoke visualization detection data based on the target smoke visualization detection data transmission coefficient.

9. A smoke visualization detection method for a wind generating nacelle, applied to the smoke visualization detection system for a wind generating nacelle according to claim 2 and comprising:

performing real-time video monitoring on the wind generating nacelle, judging whether smoke exists in the wind generating nacelle, and issuing a smoke change instruction when smoke exists in the wind generating nacelle;

when detecting the smoke change instruction, collecting smoke visualization detection data corresponding to a plurality of collection time intervals for the wind generating nacelle based on a preset smoke sensor and a preset temperature sensor, wherein the smoke visualization detection data comprises smoke visualization concentration and smoke visualization temperature, and each collection time interval is provided with a plurality of sub-collection time nodes;

analysing the smoke visualization detection data corresponding to each collection time interval, calculating a sub-smoke visualization detection data change coefficient for the collection time interval, and calculate a smoke visualization detection data transmission coefficient for the wind generating nacelle according to the sub-smoke visualization detection data change coefficient for the each collection time interval;

determining a historical transmission behavior of a data transmission path, determining current data transmission environment data of the data transmission path, and calculating a data transmission influence coefficient of the data transmission path according to the historical transmission behavior and the current data transmission environment data; and adjusting the smoke visualization detection data transmission coefficient based on the data transmission influence coefficient to obtain a target smoke visualization detection data transmission coefficient, and adjusting a data transmission strategy of the smoke visualization detection data based on the target smoke visualization detection data transmission coefficient.

* * * * *